United States Patent
Desai et al.

(10) Patent No.: US 11,527,089 B2
(45) Date of Patent: Dec. 13, 2022

(54) BUILDING LIGHT-WEIGHT SINGLE SHOT REFINEMENT NEURAL NETWORK FOR VEHICLE PASSENGER DETECTION SYSTEM

(71) Applicant: Conduent Business Services, LLC, Florham Park, NJ (US)

(72) Inventors: Hardi Desai, Morrisville, NC (US); Manasa Kolla, Puducherry (IN); Aishwarya Gupta, Uttar Pradesh (IN)

(73) Assignee: Conduent Business Services, LLC, Florham Park, NJ (US)

( * ) Notice: Subject to any disclaimer, the term of this patent is extended or adjusted under 35 U.S.C. 154(b) by 274 days.

(21) Appl. No.: 16/862,283

(22) Filed: Apr. 29, 2020

(65) Prior Publication Data

US 2021/0342580 A1  Nov. 4, 2021

(51) Int. Cl.
| | |
|---|---|
| *G06V 10/25* | (2022.01) |
| *G06V 40/10* | (2022.01) |
| *G06N 3/08* | (2006.01) |
| *G06F 17/15* | (2006.01) |
| *G06N 5/02* | (2006.01) |
| *G06V 40/16* | (2022.01) |

(52) U.S. Cl.
CPC .............. *G06V 40/10* (2022.01); *G06F 17/15* (2013.01); *G06N 3/082* (2013.01); *G06N 5/02* (2013.01); *G06V 10/25* (2022.01); *G06V 40/166* (2022.01)

(58) Field of Classification Search
CPC ...... G06V 40/10; G06V 10/25; G06V 40/166; G06F 17/15; G06N 3/082; G06N 5/02
See application file for complete search history.

(56) References Cited

U.S. PATENT DOCUMENTS

| | | |
|---|---|---|
| 8,509,997 B2 | 8/2013 | Sorimachi |
| 9,823,081 B2 | 11/2017 | Crawford et al. |
| | (Continued) | |

FOREIGN PATENT DOCUMENTS

WO   WO2015022358 A1   2/2015

OTHER PUBLICATIONS

M. Everingham, S. M. A. Eslami, L. Van Gool, C. K. I. Williams, J. Winn, and A. Zisserman. The pascal visual object classes challenge: A retrospective. International Journal of Computer Vision, 111(1):98 (136), Jan. 2015.

(Continued)

*Primary Examiner* — Syed Haider
(74) *Attorney, Agent, or Firm* — Ortiz & Lopez, PLLC; Kermit D. Lopez; Luis M. Ortiz

(57) ABSTRACT

Methods and systems for vehicle passenger detection, can involve extracting a region of interest from one or more images of a vehicle captured by one or more cameras, image-processing of the region of interest and detecting faces in the region of interest with a pruned deep neural-network based object-detection module of a neural network comprising a pruned network, and utilizing the pruned network for inference to determine a number of passengers in the vehicle. The neural network can be pruned by identifying filter pairs in the neural network having a high correlation of weights to detect features have redundant features, and iteratively removing the filter pairs wherein the neural network is retrained after the iterative removal of the filter pairs.

20 Claims, 7 Drawing Sheets

(56) References Cited

U.S. PATENT DOCUMENTS

| | | | |
|---|---|---|---|
| 10,457,208 B1 | 10/2019 | Moffa | |
| 10,480,992 B2 | 11/2019 | Sorimachi | |
| 10,621,418 B2 | 4/2020 | Tahara et al. | |
| 2010/0106567 A1 | 4/2010 | McNew et al. | |
| 2013/0035827 A1* | 2/2013 | Breed | B60W 40/06 |
| | | | 701/45 |
| 2015/0021389 A1 | 1/2015 | Gravelle | |
| 2015/0379782 A1 | 12/2015 | Nakagawa | |
| 2016/0239714 A1* | 8/2016 | Oami | G06V 20/59 |
| 2020/0079318 A1 | 3/2020 | van Vliet et al. | |
| 2021/0182077 A1* | 6/2021 | Chen | G06N 3/0445 |

OTHER PUBLICATIONS

Zhuang Liu, Mingjie Sun, Tinghui Zhou, Gao Huang, and Trevor Darrell. Rethinking the value of network pruning. CoRR, abs/1810.05270, 2018.

Pravendra Singh, Vinay Kumar Verma, Piyush Rai, and Vinay P. Namboodiri. Leveraging_Iter correlations for deep model compression. CoRR, abs/1811.10559, 2018.

Wikipedia, "Deep Learning", Retrieved from "https://en.wikipedia.org/w/index.php?title=Deep_learning&oldid=942561541"; Page last edited on Feb. 25, 2020, at 12:31 (UTC).

Wikipedia, "Convolutional neural network", Retrieved from "https://en.wikipedia.org/w/index.php?title=Convolutional_neural_network&oldid=944917484"; Page last edited on Mar. 10, 2020, at 18:16 (UTC).

"Conduent Vehicle Passenger Detection System"; Conduent, 2017.

Abhinav Kumar, Aishwarya Gupta, Bishal Santra, Lalitha KS, Manasa Kolla, Mayank Gupta, and Rishabh Singh, "VPDS: An AI-Based Automated Vehicle Occupancy and Violation Detection System", The Thirty-First AAAI Conference on Innovative Applications of Artificial Intelligence (IAAI-19), 2019.

Shifeng Zhang, et al., "Single-Shot Refinement Neural Network for Object Detection", arXiv:1711.06897v3 [cs.CV] Jan. 3, 2018.

Kaiming He, et al., "Rethinking ImageNet Pre-training", arXiv:1811.08883v1 [cs.CV] Nov. 21, 2018.

Manasa Kolla, "Using AI-Based Automated Vehicle Occupancy Detection has Many Advantages", Conduent, Mar. 13, 2019.

* cited by examiner (a) SSD Model (b) RefineDet Model (c) Pruned Model
(d) SSD Model (e) RefineDet Model (f) Pruned Model
(g) SSD Model (h) RefineDet Model (i) Pruned Model

BUILDING LIGHT-WEIGHT SINGLE SHOT REFINEMENT NEURAL NETWORK FOR VEHICLE PASSENGER DETECTION SYSTEM

TECHNICAL FIELD

Embodiments are related to vehicle passenger detection systems and methods. Embodiments further relate to the detection of violators in High Occupancy Vehicle (HOV) lanes. Embodiments further relate to neural networks used in vehicle passenger detection systems.

BACKGROUND

A Vehicle Passenger Detection System (VPDS) can be utilized to automatically count the number of passengers within a vehicle. Difficulties in successfully implementing a VPDS may arise in situations where the vehicles are is moving at speeds of, for example, 0-100 mph. It is particularly important to be able to detect violators in vehicles in High Occupancy Vehicle (HOV) lanes. Such HOV lanes can encourage car-pooling, which may result in a reduction in traffic congestion and harmful vehicle emissions.

Solutions are needed to more accurately detect passengers in vehicles using VPDS approaches, and in particular to detecting passengers who are seated in rear vehicle seats for HOV 3+ lanes using minimal hardware.

Current VPDS approaches suffer from several problems. First, most of the images obtained from conventional VPDS solutions are dark, and the naked eye cannot detect a person sitting on rear vehicle passenger seats without pre-processing of the image. In addition, the dataset utilized in conventional VPDS solutions is composed of images, which may be too dark or too bright. Another major challenge with conventional VPDS solutions and rear view profile faces is occlusion. In addition, the numbers of cases of single occupancy are far higher than vehicle occupancy involving three passengers. The dataset utilized in conventional VPDS solutions hence possesses a class imbalance problem.

BRIEF SUMMARY

The following summary is provided to facilitate an understanding of some of the innovative features unique to the disclosed embodiments and is not intended to be a full description. A full appreciation of the various aspects of the embodiments disclosed herein can be gained by taking the entire specification, claims, drawings, and abstract as a whole.

It is, therefore, one aspect of the disclosed embodiments to provide for an improved vehicle passenger detection system and method.

It is another aspect of the disclosed embodiments to provide for an improved method and system for counting the number of passengers in a side view image of the rear seat of a vehicle with fewer computational resources than found in conventional VPDS solutions without compromising on the accuracy.

It is a further aspect of the disclosed embodiments to provide a VPDS that includes an image capture module, a rear window extraction module, and a convolutional neural network (CNN) based deep learning multiclass object detection module.

It is also an aspect of the disclosed embodiments to provide a method and system for pruning images involving the removal of individual filters.

The aforementioned aspects and other objectives and advantages can now be achieved as described herein. In an embodiment, a method for vehicle passenger detection, can involve extracting a region of interest from at least one image of a vehicle captured by at least one camera; image-processing of the region of interest and detecting faces in the region of interest with a pruned deep neural-network based object-detection module of a neural network comprising a pruned network; and utilizing the pruned network for inference to determine a number of passengers in the vehicle.

In an embodiment of the method, the neural network can be pruned by: identifying filter pairs in the neural network having a high correlation of weights to detect features comprising redundant features.

In an embodiment of the method the neural network can be further pruned by iteratively removing the filter pairs wherein the neural network can be retrained after the iterative removal of the filter pairs.

In an embodiment of the method, the neural network can be further pruned by using a regularizer to increase a correlation between features.

In an embodiment of the method, the neural network further can further include a convolutional neural network (CNN) configured for deep learning multiclass object detection.

In another embodiment, a system for vehicle passenger detection, can include at least one camera, and a neural network comprising a pruned network, wherein a region of interest is extracted from at least one image of a vehicle captured by the at least one camera, wherein the region of interest and faces therein are image-processed and detected with a pruned deep neural-network based object-detection module of the neural network for inference in determining a number of passengers in the vehicle.

In an embodiment of the system, the neural network can be pruned by: identifying filter pairs in the neural network having a high correlation of weights to detect features comprising redundant features.

In an embodiment of the system, the neural network can be further pruned by: iteratively removing the filter pairs wherein the neural network can be retrained after the iterative removal of the filter pairs.

In an embodiment of the system, the neural network can be further pruned by: using a regularizer to increase a correlation between features.

In an embodiment of the system, the neural network can further comprise a convolutional neural network (CNN) configured for deep learning multiclass object detection.

In another embodiment, a system for vehicle passenger detection, can include at least one processor and a memory, the memory storing instructions to cause the at least one processor to perform: extracting a region of interest from at least one image of a vehicle captured by at least one camera; image-processing of the region of interest and detecting faces in the region of interest with a pruned deep neural-network based object-detection module of a neural network comprising a pruned network; and utilizing the pruned network for inference to determine a number of passengers in the vehicle.

BRIEF DESCRIPTION OF THE DRAWINGS

The accompanying figures, in which like reference numerals refer to identical or functionally-similar elements throughout the separate views and which are incorporated in and form a part of the specification, further illustrate the embodiments and, together with the detailed description of the invention, serve to explain the principles of the embodiments.

DETAILED DESCRIPTION

Figure 1:
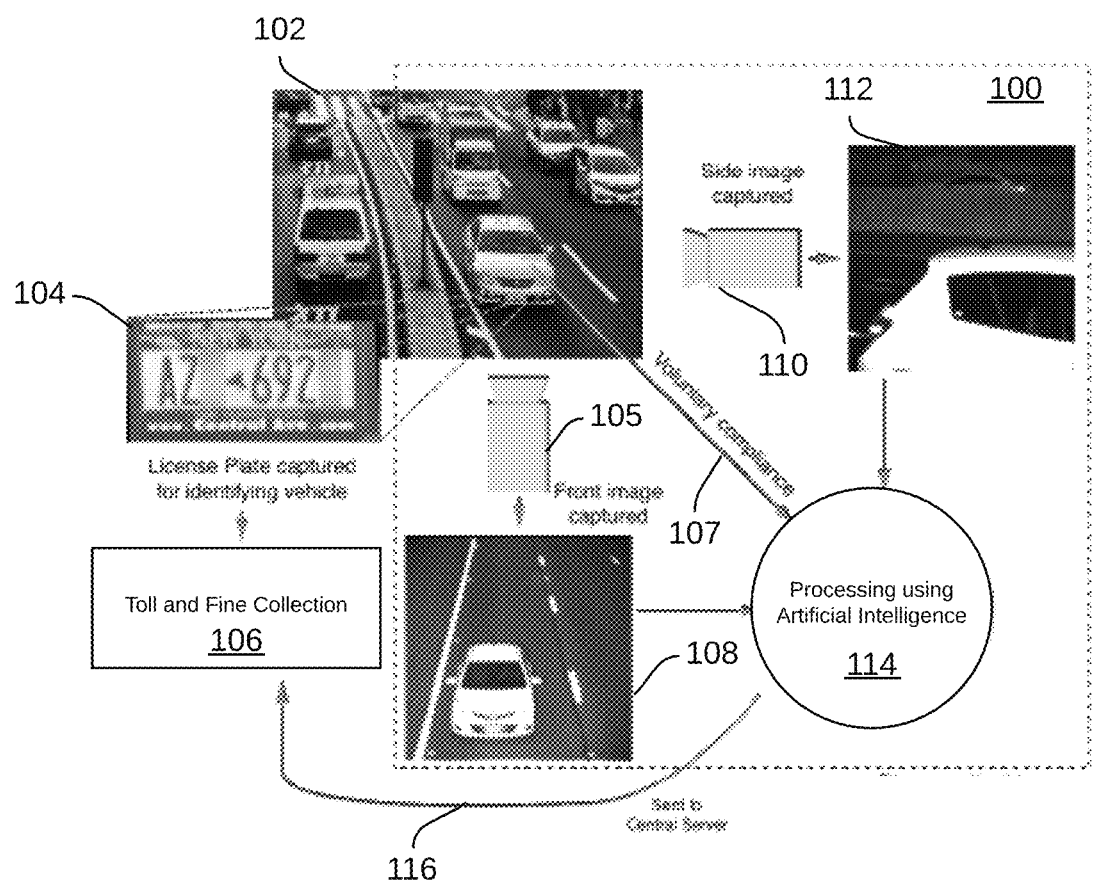
FIG. 1 illustrates a schematic diagram of a Vehicle Passenger Detection System (VPDS), which can be implemented in accordance with an embodiment.

The particular values and configurations discussed in these non-limiting examples can be varied and are cited merely to illustrate one or more embodiments and are not intended to limit the scope thereof.

Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware, or any combination thereof (other than software per se). The following detailed description is, therefore, not intended to be interpreted in a limiting sense.

Throughout the specification and claims, terms may have nuanced meanings suggested or implied in context beyond an explicitly stated meaning. Likewise, phrases such as "in one embodiment" or "in an example embodiment" and variations thereof as utilized herein do not necessarily refer to the same embodiment and the phrase "in another embodiment" or "in another example embodiment" and variations thereof as utilized herein may or may not necessarily refer to a different embodiment. It is intended, for example, that claimed subject matter include combinations of example embodiments in whole or in part.

In general, terminology may be understood, at least in part, from usage in context. For example, terms such as "and," "or," or "and/or" as used herein may include a variety of meanings that may depend, at least in part, upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein, depending at least in part upon context, may be used to describe any feature, structure, or characteristic in a singular sense or may be used to describe combinations of features, structures, or characteristics in a plural sense. Similarly, terms such as "a," "an," or "the", again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

Several aspects of data-processing systems will now be presented with reference to various systems and methods. These systems and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. A mobile "app" is an example of such software.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer.

By way of example, and not limitation, such computer-readable media can include read-only memory (ROM), random-access memory (RAM), electrically erasable programmable ROM (EEPROM), including ROM implemented using a compact disc (CD) or other optical disk storage, magnetic disk storage or other magnetic storage devices, or any other medium that can be used to carry or store desired program code in the form of instructions or data structures and that can be accessed by a computer. The terms disk and disc, as used herein, can include compact discs, laser discs, optical discs, a digital versatile disc (DVD), and a floppy disk where disks usually reproduce data magnetically, while discs reproduce data optically with lasers. Combinations of the above should also be included within the scope of computer-readable media.

As will be discussed in greater detail herein, the disclosed embodiments relate to methods and systems for counting the number of passengers in the rear seat of a vehicle more accurately through the use of a convolutional neural network (CNN) based object detection algorithm. With this approach, an object detection network can be pruned to reduce the memory usage and inference time while maintaining competitive accuracy. In addition, a novel filter correlation based pruning methodology can be implemented, which could be applied to any deep neural network. We have trained a single stage object detection algorithm for understanding a base performance. Next, we can calculate the correlation between filters of each convolutional layer. We can increase the correlation to at least 0.9 between certain filter pair and remove one filter from the pair. In may be important in some cases to increase the correlation so that we do not lose any information in the pruned architecture. Hence, we can not only remove the weights but can also remove connections in the utilized deep neural network. The disclosed approach has been tested on VPDS datasets from different sites to achieve a 40% reduction in the memory usage without compromising the performance. Note that the aforementioned architecture include a pruned deep neural-network based object-detection module.

Note that the term convolutional neural network (CNN) as utilized herein can relate to a class of deep neural networks in the context of deep learning, which can be applied to analyzing visual imagery. A CNN is also known as a shift invariant or space invariant artificial neural networks (SI-ANN), based on their shared-weights architecture and translation invariance characteristics. The term "deep learning" as utilized herein can relate to the broad family of machine learning methods based on artificial neural networks with representation learning. Learning can be supervised, semi-supervised, or unsupervised.

FIG. 1 illustrates a schematic diagram of a Vehicle Passenger Detection System (VPDS) 100, in accordance with an embodiment. The VPDS 100 can communicate with a toll and fine collection module 106 that can receive data from an artificial intelligence (AI) module 114 that can process data using AI. The VPDS 100 can further include a group of cameras including a camera 105 and a camera 110. The camera 105 and the camera 110 (and other cameras as necessary) are elements that can monitor vehicles as shown in image 102 (which may be a video image). In the example shown in FIG. 1, the image 102 can be an image of, for example, one or more vehicles on a toll road or in an HOV lane. The camera 105 is an element that can capture a front image (or video/images) of a vehicle as shown at block 108. This image can be provided as input to the AI module 114 for processing.

The camera 110 can capture a side image of the same vehicle, as shown at block 112. The side image of the vehicle can also be provided as data input to the AI module 114. In the example shown in FIG. 1, camera 110 is shown as capturing side images of vehicles. It can be appreciated, however, that the camera 110 can also be used to capture rear images of vehicles. Thus, the camera 110 can capture a side view image of the vehicle including a rear side view of the vehicle.

A license plate image of the vehicle can also be captured, as shown at block 104 and processed by the toll and fine collection module 106. Note that the toll and fine collection module 106 can be maintained and processed at a central server as indicated by arrow 116. The VPDS 100 also facilitates voluntary compliance as indicated at arrow 107 whereby a vehicle driver can voluntarily provide specific information such as the number of passengers in his or her vehicle for processing by the AI module 114.

As will be discussed in greater detail herein, the AI module 114 can implement a pruned deep neural network for object detection as a single shot refinement neural network for detecting passengers from monochrome profile rear view images captured from a vehicle in motion. FIG. 1 thus depicts a vehicle occupancy count processing pipeline, which can involve capturing and localizing the front and the rear images by two or more distinct cameras and processing such images.

In some embodiments, the VPDS 100 shown in FIG. 1 can be implemented in a fixed installation in which the camera 110 and the camera 105 are mounted in a fixed configuration on an existing or new infrastructure. The camera 110 and the camera 105 along with elements such as illuminators and an electronics package that includes a video image process may be mounted firmly attached to, for example, poles and/or gantries.

In other embodiments the VPDS 100 shown in FIG. 1 can be implemented in a mobile installation deployed as a mobile unit, which can be configured as a self-contained system mounted on, for example, a trailer that may be transported from location to location to ensure that violation enforcement points can be moved around, in order to keep potential violators honest.

Figure 2:
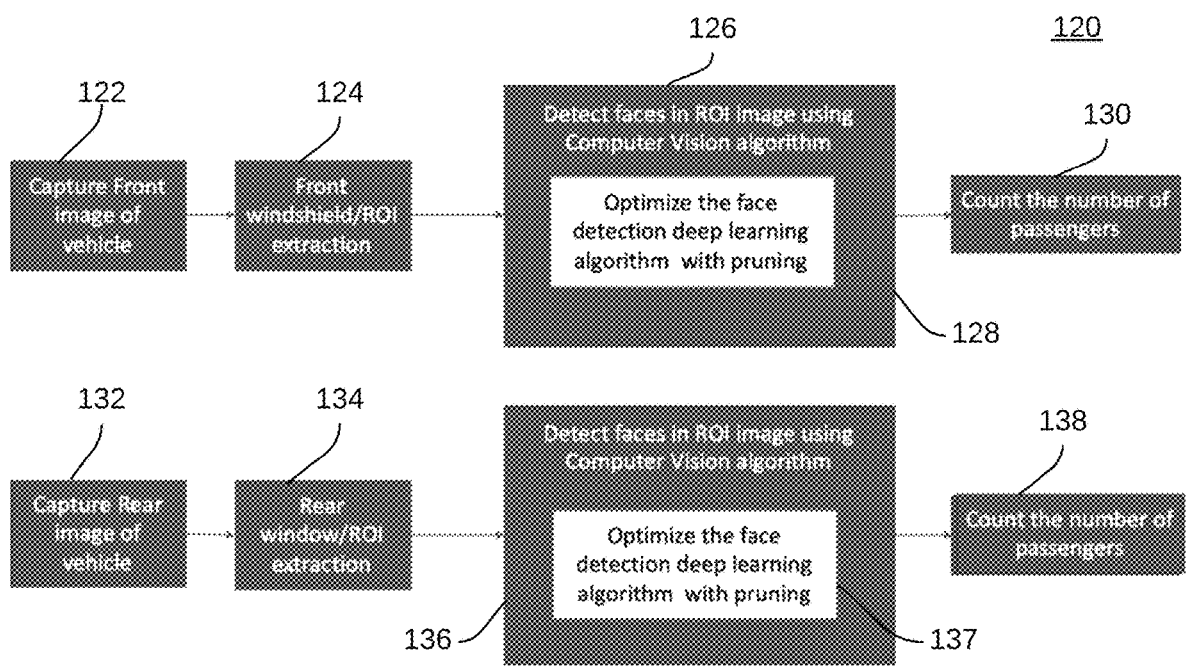
FIG. 2 illustrates a flow diagram depicting logical operational steps of a pruning-based method for optimizing face detection for use with a VPDS, in accordance with an embodiment.

FIG. 2 illustrates a flow diagram depicting logical operational steps of a pruning-based method 120 for optimizing face detection for use with a VPDS, in accordance with an embodiment. The AI module 114 shown in FIG. 1 can implement the pruning-based method 120, which can involve extracting the region of interests (ROIs) from the captured image at the deployment site. The occupancy of a vehicle can be then detected from the extracted ROIs.

Note that captured images may have poor illumination along with a great deal of occlusion. To effectively detect passengers, a window view can be cropped during ROI extraction and the cropped image use as input to a face detection algorithm implemented by the AI module 114. Note that the AI module may implement an AI algorithm such as, for example, a face detection deep learning algorithm. The pruning-based method 120 can further optimize a face detection model to be deployed at the edge while maintaining the competitive accuracy.

The pruning-based method 120 includes two sets of operations. The first set of operations includes the steps or operations shown at block 122, block 124, block 126, and block 130. The second set of operations includes the steps or operations depicted at block 132, block 134, block 136, block 137, and block 138. Thus, as shown at block 122, a step or operation can be implemented in which the front image of a vehicle is captured by a camera such as the camera 105 shown in FIG. 1.

Thereafter, as depicted at block 124, a step or operation can be implemented in which a front windshield/ROI is extracted from captured image. Next, as shown at block 126, a step or operation can be implemented in which one or more faces in the ROI image are detected using a computer vision algorithm. The step or operation depicted at block 126 can further involve optimizing the utilized face detection deep learning algorithm with pruning, as shown at block 128. Thereafter, as depicted at block 130, a step or operation can be implemented in which the number of passengers in the vehicle can be counted.

As depicted at block 132, a step or operation can be implemented in which the rear image (e.g., a side view rear image) of the vehicle can be captured by a camera in a VPDS such as the VPDS 100. Next, as shown at block 134, a step or operation can be implemented in which the rear window/ROI in side view image of the vehicle can be extracted from the captured side view and rear image of the vehicle. Thereafter, as illustrated at block 136, a step or operation can be implemented in which one or more faces in the ROI image can be detected using the previously discussed computer vision algorithm. The step or operation depicted at block 136 can further include a step or operation for optimizing the face detection deep learning algorithm with pruning as depicted at block 137. Next, as shown at block 138, a step or operation can be implemented in which the number of passengers in the vehicle can be counted.

Figure 3:
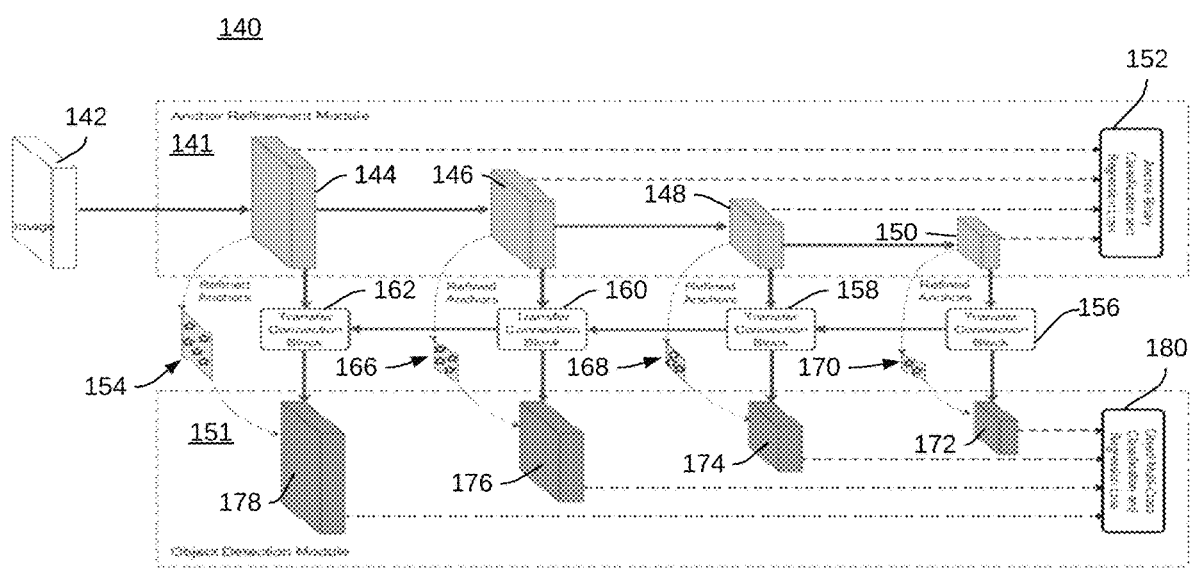
FIG. 3 illustrates a single-shot refinement neural network that functions as a single stage object detection network, in accordance with an embodiment.

FIG. 3 illustrates a single-shot refinement neural network (RefineDet) 140 that can function as a single-shot object detection network, in accordance with an embodiment. The disclosed embodiments can involve the use of a single-shot refinement neural network to construct a face detection model and build a novel approach to prune the trained model in order to save cost, memory, and time. computation at the edge for deployment.

The single-shot refinement neural network 140 is an element that can function as a single-shot object detection network that can include two or more interconnected modules: an anchor refinement module (ARM) 141 and an object detection module (ODM) 151. Note that the ODM 151 can be implemented as a pruned deep neural-network based object-detection module of a neural network. The ARM 141 and ODM 151 are elements that can be implemented as a part of an AI module such as the previously discussed AI module 114 depicted in FIG. 1. An image 142 captured by a camera such as the camera 105 and camera 110 shown in FIG. 1 can be provided to the ARM 141 and specifically to a first processing block 144, which in turn outputs data that can be provided as input to an anchor binary classification and regression loss module 152 and also as input to a second processing block 146. Data output from the second processing block 146 can be provided as input to a third processing block 148 and also as input to the anchor binary classification and regression loss module 152. Data output from the third processing block 148 can be provided as input to a fourth processing block 150 and also as input to the anchor binary classification and regression loss module 152. Furthermore, data output from the fourth processing block 150 can be provided as input to the anchor binary classification and regression loss module 152.

The ODM 151 can include its own anchor binary classification and regression loss module 180, which can function in a fashion similar to the anchor binary classification and regression loss module 152 of the ARM 141. The ODM 151 can further include a first processing block 178, a second processing block 176, a third processing block 174, and a fourth processing block 172, which are similar or identical to the respective first processing block 144, the second processing block 46, the third processing block 148, and the fourth processing block 150 of the ARM 141.

The ARM 141 can be responsible for filtering out negative anchors for reduction in the search space for the classifier 152 and the classifier 180 and coarsely adjusting the locations and sizes of anchors to provide better initialization for the subsequent regressor. The ODM 151 can detect the object by improving the regression of ARM module 141 and predicting a multi-class label. The single stage object detection network can include a group of transfer connection blocks 162, 160, 158, 156 for transferring the features from the ARM Module 141 to the ODM Module 151. The entire single stage object detection network 140 can be trained end-to-end using a multitask loss function, which can be provided by the anchor binary classification and regression loss module 152 and/or the anchor binary classification and regression loss module 180. Refined anchors are also depicted in FIG. 3 as a refined anchor 151, a refined anchor 166, a refined anchor 168, and a refined anchor 170.

Step 1, Step 2, Step 3, and Step 4 can be summarized in more detail as follows:

Step 1: Training Base Model—The previously discussed single shot refinement neural network with VGG as a base architecture can be initialized with imagenet weights and trained on the ROIs extracted from the images captured with the camera.

Step 2: Selection of Correlated Filter Pairs—All the filter pairs in the convolutional layer are ranked based upon the correlation coefficient. Top n filter pairs can be selected for further optimization.

Step 3: Increase Correlation between Selected Pairs—The concept here is to have a minimum information loss due to model compression. In order to transfer the information from one filter to another filter in a given filter pair, the correlation coefficient for the selected filter pair has to maximize it to at least 0.9. This can be accomplished by fine-tuning the trained model with a new regularizer for increasing the correlation coefficient. The regularizer can be defined as a negative log of a normalized filter correlation. Mathematically, this can be expressed as:

$$R = -\log\left(\frac{\sum_{n=1}^{n=N} \rho_{X,Y}}{N}\right)$$

Step 4: Selection of Filters for Pruning—One filter from each filter pair can be selected for pruning using an iterative weight based approach. All the filters can be represented in a graphical structure and each filter can be given a weight based upon the number of filters it is correlated with. Filters with maximum weights can be removed and weights of all the remaining filters can be updated. This process can be carried out iteratively as depicted in FIG. 4.

Figure 4:
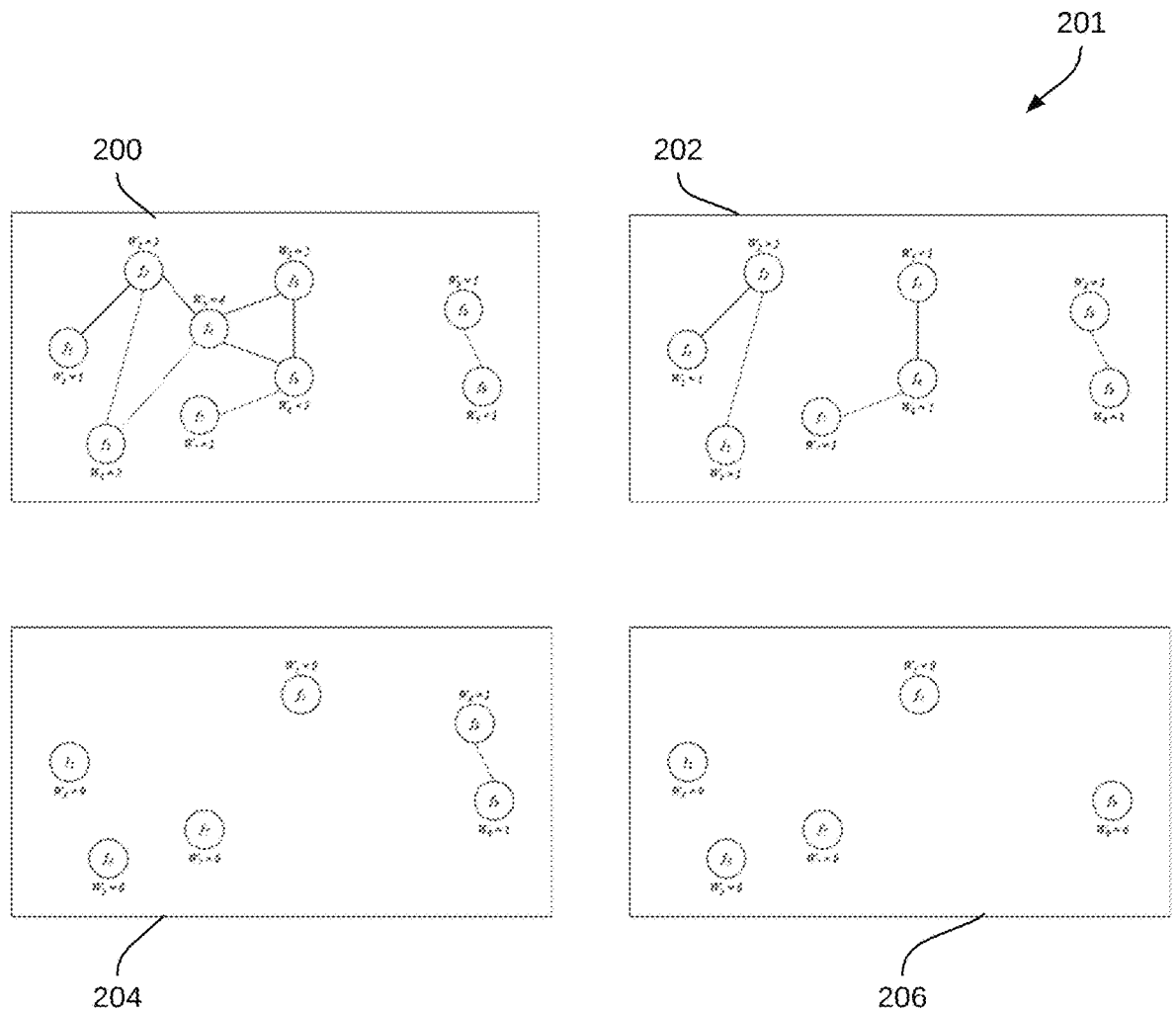
FIG. 4 illustrates steps of filter selection in a pruning methodology, which can be implemented in accordance with an embodiment.

FIG. 4 illustrates operational steps of a pruning method 201, which can be implemented in accordance with an embodiment. As shown in FIG. 4, the method 201 can include a first step 200 (also referred to as Step 1), a second step 202 (also referred to as Step 2), a third step 204 (also referred to as Step 3) and a fourth step 206 (also referred as Step 4). Step 1 as illustrated in FIG. 4 depicts a graphical structure with weights. Step 2 as shown in FIG. 4 graphically depicts an operation involving removing filters with a weight=4 and updating the remaining filters. Step 3 as depicted in FIG. 4 graphically illustrates an operation involving removing filters with weight=2. Step 4 as shown in FIG. 4 graphically illustrates an operation involving removing one filter from a pair having updated remaining filters.

Step 5: Re-train Pruned Network—The pruned network can be retrained from scratch.

Experiments have been conducted on a single shot refine network as discussed herein with VGG as a base architecture. In such experimental embodiments, all the convolutional layers in the base architecture except the first input layer were pruned. The first convolutional channel extracts features from the image. Pruning the first layer can, however, lead to loss of input features. Hence, we do not necessarily need to select the first convolutional layer while pruning. Predictions can be made on the layers, Conv_4_3, Conv_5_3, Conv_fc_7 and Conv_6_2, for example, for a VGG16 base architecture in RefineDet. As we prune all the convolutional layers in the base architecture, all the connections from the convolutional layer to the Transfer Connection Block and Anchor Refinement Module can also be pruned at the selected filter index.

Example experimental results are shown in Table 1 below:

TABLE 1

| Optimization Iterations | Retrain Iterations | No. Filters Removed (Correlated) | Validation Set Accuracy | Test Set Accuracy | No of Basenet Filters | Percentage Model Pruned |
|---|---|---|---|---|---|---|
| Basenet-56 | 0 | 0 | 93.78% | 82.35% | 55914 | 0% |
| 35 | 47 | 689(1586) | 93.52% | 82.52% | 49713 | 11.09% |
| 19 | 50 | 893(2016) | 95.37% | 79.36% | 47877 | 14.37% |
| 13 | 35 | 2580 | 91.00% | 77.29% | 32694 | 41.52% |

Figure 5:
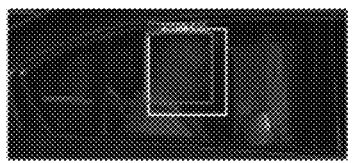
FIG. 5 illustrates examples of processed images of detected faces in accordance with the disclosed embodiments.
Figure 5:
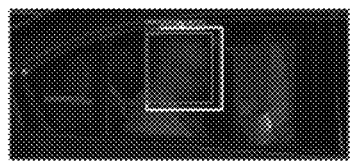
Figure 5:
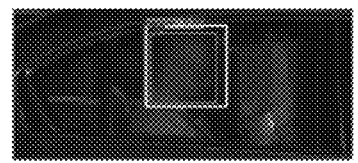
Figure 5:
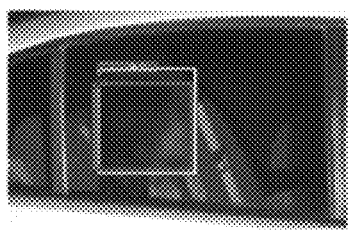
Figure 5:
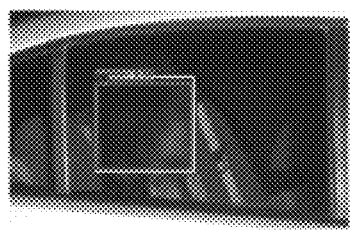
Figure 5:
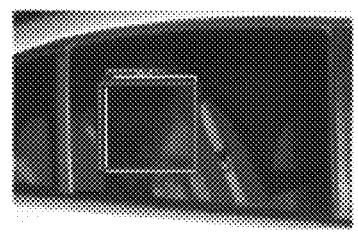
Figure 5:
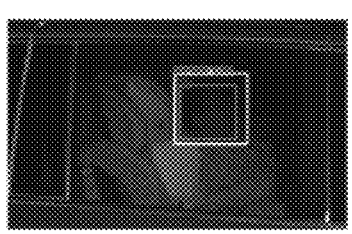
Figure 5:
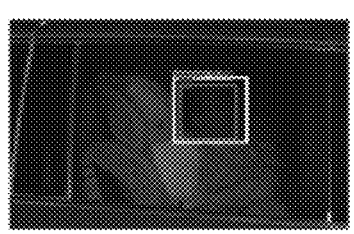
Figure 5:
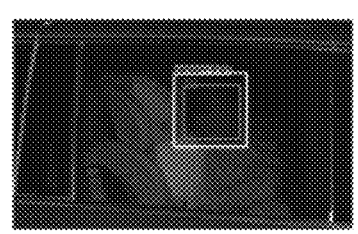

FIG. 5 illustrates a group of example images 300 processed according to different models including an SSD model, a RedefineDet model, and a pruned model. The group of example images 300 shown in FIG. 5 includes images (a) through (i). The resulting images 300 shown in FIG. 5 and the experimental data depicted in Table 1 above demonstrate that the results of the pruned model can be equivalent to the original model.

The disclosed method can thus involve constructing a compressed and lightweight object detection model capable of producing results in "real-time" by pruning the connections as well as the weights in the model. This approach can encourage pairwise filter correlation based pruning of an object detection algorithm, which can be referred to as a single-shot refinement neural network. This approach thus introduces a novel loss function as a regularizer for increasing filter correlation before pruning. In addition, the disclosed embodiments can demonstrate the presence of redundant filters in object detection algorithms and that it may be possible to achieve equal or higher accuracy with an object detection model with reduced parameters. The disclosed embodiments can also offer an effective exploration of a one-shot pruning algorithm for object detection.

Although experiments have been conducted with one-shot pruning, it is believed that iterative pruning can yield better results. In addition, we can extend the disclosed correlation-based pruning approach by including sparsity measure for more effective network pruning.

The disclosed embodiments are described at least in part herein with reference to the flowchart illustrations, steps and/or block diagrams of methods, systems, and computer program products and data structures and scripts. It will be understood that each block of the illustrations, and combinations of blocks, can be implemented by computer program instructions. These computer program instructions may be provided to a processor of, for example, a general-purpose computer, special-purpose computer, or other programmable data processing apparatus to produce a machine, such that the instructions, which can execute via the processor of the computer or other programmable data processing apparatus, and may create means for implementing the functions/acts specified in the block or blocks.

To be clear, the disclosed embodiments can be implemented in some cases in the context of, for example a special-purpose computer or a general-purpose computer, or other programmable data processing apparatus or system. For example, in some example embodiments, a data processing apparatus or system can be implemented as a combination of a special-purpose computer and a general-purpose computer. In this regard, a system composed of different hardware and software modules and different types of features may be considered a special-purpose computer designed with a purpose of image processing images captured by an image-capturing device, such as discussed herein. In general, however, embodiments may be implemented as a method, and/or a computer program product at any possible technical detail level of integration. The computer program product may include a computer readable storage medium (or media) having computer readable program instructions thereon for causing a processor to carry out aspects of the embodiments, such as the steps, operations or instructions described herein.

The aforementioned computer program instructions may also be stored in a computer-readable memory that can direct a computer or other programmable data processing apparatus to function in a particular manner, such that the instructions (e.g., steps/operations) stored in the computer-readable memory produce an article of manufacture including instruction means, which can implement the function/act specified in the various block or blocks, flowcharts, and other architecture illustrated and described herein.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the block or blocks herein.

The flow charts and block diagrams in the figure can illustrate the architecture, the functionality, and the operation of possible implementations of systems, methods, and computer program products according to various embodiments (e.g., preferred or alternative embodiments). In this regard, each block in the flow chart or block diagrams may represent a module, a segment, or a portion of instructions, which comprises one or more executable instructions for implementing the specified logical function(s).

In some alternative implementations, the functions noted in the blocks may occur out of the order noted in the figures. For example, two blocks shown in succession may, in fact, be executed concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The functionalities described herein may be implemented entirely and non-abstractly as physical hardware, entirely as physical non-abstract software (including firmware, resident software, micro-code, etc.) or combining non-abstract software and hardware implementations that may all generally be referred to herein as a "circuit," "module," "engine", "component," "block", "database", "agent" or "system." Furthermore, aspects of the present disclosure may take the form of a computer program product embodied in one or more non-ephemeral computer readable media having computer readable and/or executable program code embodied thereon.

Figure 6:
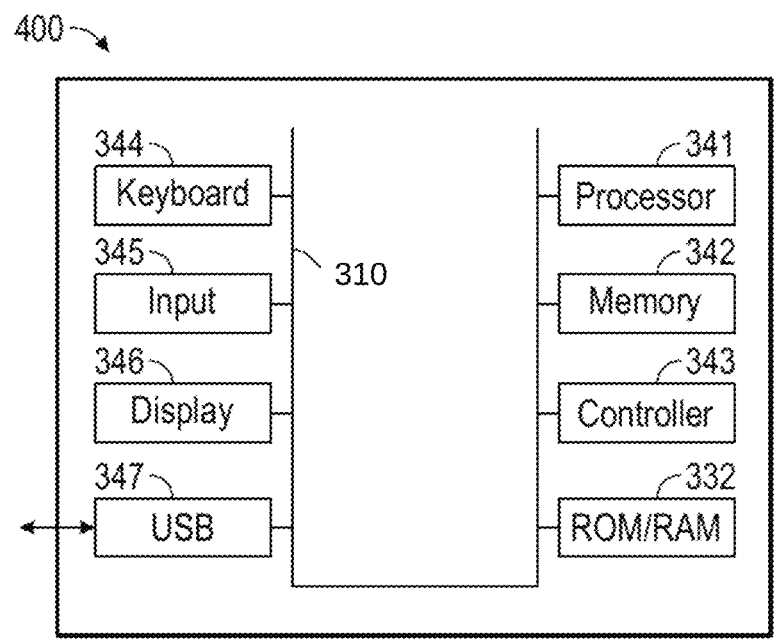
FIG. 6 illustrates a schematic view of a data-processing system, in accordance with an embodiment.
Figure 7:
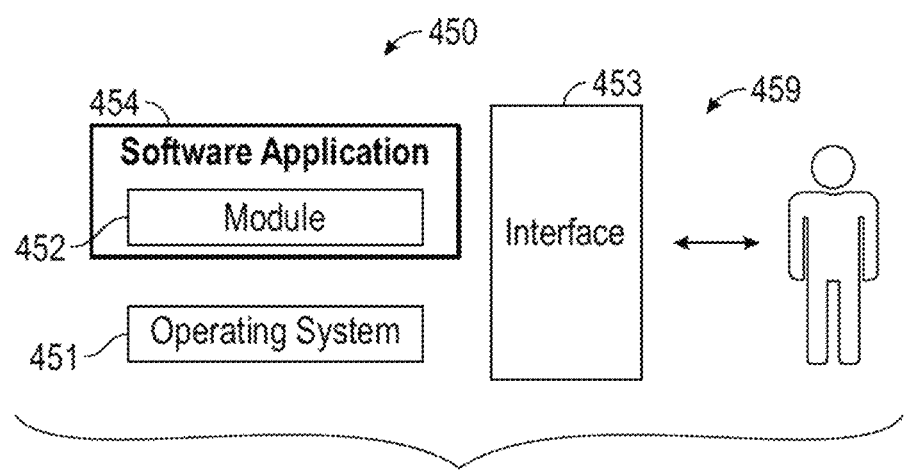
FIG. 7 illustrates a schematic view of a software system including a module, an operating system, and a user interface, in accordance with an embodiment.

FIG. 6 and FIG. 7 are shown only as exemplary diagrams of data-processing environments in which example embodiments may be implemented. It should be appreciated that FIG. 6 and FIG. 7 are only exemplary and are not intended to assert or imply any limitation with regard to the environments in which aspects or embodiments of the disclosed embodiments may be implemented. Many modifications to the depicted environments may be made without departing from the spirit and scope of the disclosed embodiments.

As illustrated in FIG. 6, some embodiments may be implemented in the context of a data-processing system 400 that can include, for example, one or more processors such as a processor 341 (e.g., a CPU (Central Processing Unit) and/or other microprocessors), a memory 342, a controller 343, additional memory such as ROM/RAM 332 (i.e. ROM and/or RAM), a peripheral USB (Universal Serial Bus) connection 347, a keyboard 344 and/or another input device 345 (e.g., a pointing device, such as a mouse, track ball, pen device, etc.), a display 346 (e.g., a monitor, touch screen display, etc) and/or other peripheral connections and components.

A system bus 310 can serve as a main electronic information highway interconnecting the other illustrated components of the hardware of data-processing system 400. The system bus 310 can function as a communication system that transfers data between components inside the data-processing system 400 (e.g., a computer), or between computers. The system bus 310 can include all related hardware components (e.g., wire, optical fiber, etc.) and software, including communication protocols.

In some embodiments, the processor 341 may be a CPU that functions as the central processing unit of the data-processing system 400, performing calculations and logic operations required to execute a program. Read only memory (ROM) and random access memory (RAM) of the ROM/RAM 344 constitute examples of non-transitory computer-readable storage media.

The controller 343 can interface with one or more optional non-transitory computer-readable storage media to the system bus 310. These storage media may include, for example, an external or internal DVD drive, a CD ROM drive, a hard drive, flash memory, a USB drive or the like. These various drives and controllers can be optional devices. Program instructions, software or interactive modules for providing an interface and performing any querying or analysis associated with one or more data sets may be stored in, for example, ROM and/or RAM 344. Optionally, the program instructions may be stored on a tangible, non-transitory computer-readable medium such as a compact disk, a digital disk, flash memory, a memory card, a USB drive, an optical disc storage medium and/or other recording medium As illustrated, the various components of data-processing system 400 can communicate electronically through a system bus 310 or similar architecture. The system bus 310 may be, for example, a subsystem that transfers data between, for example, computer components within data-processing system 400 or to and from other data-processing devices, components, computers, etc. The data-processing system 400 may be implemented in some embodiments as, for example, a server in a client-server based network (e.g., the Internet) or in the context of a client and a server (i.e., where aspects are practiced on the client and the server).

In some example embodiments, data-processing system 400 may be, for example, a standalone desktop computer, a laptop computer, a Smartphone, a pad computing device and so on, wherein each such device is operably connected to and/or in communication with a client-server based network or other types of networks (e.g., cellular networks, Wi-Fi, etc).

FIG. 7 illustrates a computer software system 450 for directing the operation of the data-processing system 400 depicted in FIG. 6. The software application 454, may be stored for example in memory 342 and/or another memory and can include one or more modules such as the module 452. The computer software system 450 also includes a kernel or operating system 451 and a shell or interface 453. One or more application programs, such as software application 454, may be "loaded" (i.e., transferred from, for example, mass storage or another memory location into the memory 342) for execution by the data-processing system 400. The data-processing system 400 can receive user commands and data through the interface 453; these inputs may then be acted upon by the data-processing system 400 in accordance with instructions from operating system 451 and/or software application 454. The interface 453 in some embodiments can serve to display results, whereupon a user 459 may supply additional inputs or terminate a session. The software application 454 can include module(s) 452, which can, for example, implement the steps, instructions, operations and algorithms such as those discussed herein. For example, the module 452 can implement the steps, operations and instructions illustrated and described herein with respect to the various blocks shown in the figures herein.

The following discussion is intended to provide a brief, general description of suitable computing environments in which the system and method may be implemented. Although not required, the disclosed embodiments will be described in the general context of computer-executable instructions, such as program modules, being executed by a single computer. In most instances, a "module" (also referred to as an "engine") may constitute a software application, but can also be implemented as both software and hardware (i.e., a combination of software and hardware).

Generally, program modules include, but are not limited to, routines, subroutines, software applications, programs, objects, components, data structures, etc., that perform particular tasks or implement particular data types and instructions. Moreover, those skilled in the art will appreciate that the disclosed method and system may be practiced with other computer system configurations, such as, for example, hand-held devices, multi-processor systems, data networks, microprocessor-based or programmable consumer electronics, networked PCs, minicomputers, mainframe computers, servers, and the like.

Note that the term module as utilized herein can refer to a collection of routines and data structures, which can perform a particular task or can implement a particular data type. A module can be composed of two parts: an interface, which lists the constants, data types, variable, and routines that can be accessed by other modules or routines, and an implementation, which is typically private (accessible only to that module) and which includes source code that actually implements the routines in the module. The term module as utilized may also simply refer to an application, such as a computer program designed to assist in the performance of a specific task, such as word processing, accounting, inventory management, etc.

In some example embodiments, the term "module" can also refer to a modular hardware component or a component that is a combination of hardware and software. It should be appreciated that implementation and processing of the disclosed modules, whether primarily software-based and/or hardware-based or a combination thereof, according to the approach described herein can lead to improvements in processing speed and ultimately in energy savings and efficiencies in a data-processing system such as, for example, the data-processing system 400 shown in FIG. 6.

The disclosed embodiments can constitute an improvement to a computer system (e.g., such as the data-processing system 400 shown in FIG. 6) rather than simply the use of the computer system as a tool. The disclosed modules, instructions, steps and functionalities discussed herein can result in a specific improvement over prior systems, resulting in improved data-processing systems.

FIG. 6 and FIG. 7 are intended as examples and not as architectural limitations of disclosed embodiments. Additionally, such embodiments are not limited to any particular application or computing or data processing environment. Instead, those skilled in the art will appreciate that the disclosed approach may be advantageously applied to a variety of systems and application software. Moreover, the disclosed embodiments can be embodied on a variety of different computing platforms, including Macintosh, UNIX, LINUX, and the like.

It is understood that the specific order or hierarchy of steps, operations, or instructions in the processes or methods disclosed is an illustration of exemplary approaches. For example, the various steps, operations or instructions discussed herein can be performed in a different order. Similarly, the various steps and operations of the disclosed example pseudo-code discussed herein can be varied and processed in a different order. Based upon design preferences, it is understood that the specific order or hierarchy of such steps, operation or instructions in the processes or methods discussed and illustrated herein may be rearranged. The accompanying claims, for example, present elements of the various steps, operations or instructions in a sample order, and are not meant to be limited to the specific order or hierarchy presented.

Figure 8:
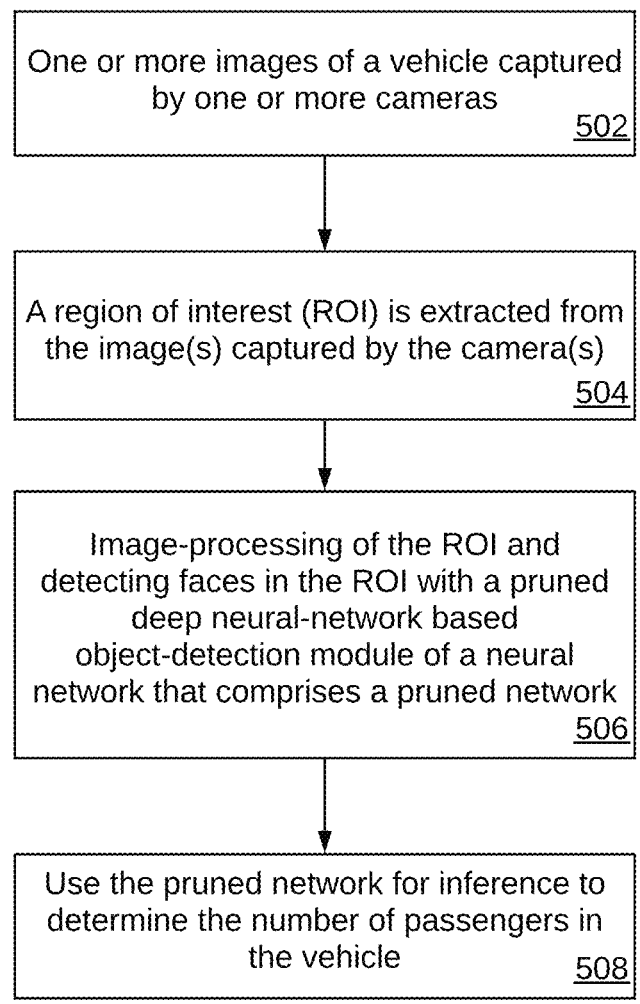
FIG. 8 illustrates a high level flow chart of operations depicting logical operational steps of a method 500 for vehicle passenger detection, in accordance with an embodiment.

FIG. 8 illustrates a high level flow chart of operations depicting logical operational steps of a method 500 for vehicle passenger detection, in accordance with an embodiment. As shown at block 502, a step or operation can be implemented in which one or more images of a vehicle can be captured by one or more cameras. Next, as shown at block 504, a step or operation can be implemented in which a region of interest is extracted from the image(s) captured by the camera(s). Then, as shown at block 506, a step or operation can be implemented for image-processing of the region of interest and detecting faces in the region of interest with a pruned deep neural-network based object-detection module of a neural network comprising a pruned network. Thereafter, as shown at block 508, a step or operation can be implemented for utilizing the pruned network for inference to determine the number of passengers in the vehicle. Note that the term "image-processing" or "image processing" as utilized herein can involve digital image processing to process digital images through an algorithm or method such as discussed herein.

As discussed previously the network can be pruned to produce the pruned network by identifying filter pairs in the neural network having a high correlation of weights to detect features comprising redundant features, and iteratively removing the filter pairs wherein the neural network is retrained after the iterative removal of the filter pairs.

The inventors have realized a non-abstract technical solution to the technical problem to improve a computer-technology by improving efficiencies in such computer technology. The disclosed embodiments offer technical improvements to a computer-technology such as a data-processing system, and further provide for a non-abstract improvement to a computer technology via a technical solution to the technical problem(s) identified in the background section of this disclosure. The disclosed embodiments require less time for processing and also fewer resources in terms of memory and processing power in the underlying computer technology. For example, as discussed previously, the disclosed approached has resulted in a 40% reduction in the memory usage without compromising system performance. Such improvements can result from implementations of the disclosed embodiments. The claimed solution may be rooted in computer technology in order to overcome a problem specifically arising in the realm of computers and computer networks.

It will be appreciated that variations of the above-disclosed and other features and functions, or alternatives thereof, may be desirably combined into many other different systems or applications. It will also be appreciated that various presently unforeseen or unanticipated alternatives, modifications, variations or improvements therein may be subsequently made by those skilled in the art which are also intended to be encompassed by the following claims.

What is claimed is:

1. A method for vehicle passenger detection, comprising:
   extracting a region of interest from at least one image of a vehicle captured by at least one camera;
   image-processing of the region of interest and detecting faces in the region of interest with a neural network comprising a pruned deep neural-network based object-detection model for detecting a profile view of the faces of people sitting on a rear side of the vehicle, the neural network including an anchor refine module (ARM) and an object detection module (ODM), wherein the region of interested extracted from the at least one image captured by the at least one camera is provided to the ARM; and
   utilizing the pruned neural network including the ODM for inference to determine a number of passengers in the vehicle.

2. The method of claim 1 wherein the neural network is pruned by:
   identifying filter pairs in the neural network having a high correlation of weights to detect features comprising redundant features.

3. The method of claim 2 wherein the neural network is pruned by:
   iteratively removing the filter pairs, wherein the neural network is retrained after the iterative removal of the filter pairs.

4. The method of claim 1 wherein the neural network is pruned to comprise the deep neural network by:

identifying filter pairs in the neural network having a high correlation of weights to detect features comprising redundant features, and iteratively removing the filter pairs, wherein the neural network is retrained after the iterative removal of the filter pairs.

5. The method of claim 4 where the neural network is further pruned by using a regularizer to increase a correlation between features.

6. The method of claim 1 wherein the neural network further comprises a convolutional neural network (CNN).

7. The method of claim 6 wherein the CNN is operable for deep learning multiclass object detection.

8. A system for vehicle passenger detection, comprising:
at least one camera; and
a neural network comprising a pruned network comprising a pruned deep neural network based object detection model for detecting a profile view of faces of people sitting at a rear side of a vehicle, the neural network including an anchor refine module (ARM) and an object detection module (ODM), wherein a region of interest is extracted from at least one image of the vehicle captured by the at least one camera and provided to the ARM of the neural network, wherein the region of interest and the faces therein are image-processed and detected with the ODM of the pruned deep neural-network for inference in determining a number of passengers in the vehicle.

9. The system of claim 8 wherein the neural network is pruned by:
identifying filter pairs in the neural network having a high correlation of weights to detect features comprising redundant features.

10. The system of claim 9 wherein the neural network is further pruned by:
iteratively removing the filter pairs, wherein the neural network is retrained after the iterative removal of the filter pairs.

11. The system of claim 8 wherein the neural network is pruned by:
identifying filter pairs in the neural network having a high correlation of weights to detect features comprising redundant features, and
iteratively removing the filter pairs, wherein the neural network is retrained after the iterative removal of the filter pairs.

12. The system of claim 11 where the neural network is further pruned by using a regularizer to increase a correlation between features.

13. The system of claim 8 wherein the neural network further comprises a convolutional neural network (CNN).

14. The system of claim 13 wherein the CNN is configured for deep learning multiclass object detection.

15. A system for vehicle passenger detection, comprising:
at least one processor and a memory, the memory storing instructions to cause the at least one processor to perform:
extracting a region of interest from at least one image of a vehicle captured by at least one camera;
image-processing of the region of interest and detecting faces in the region of interest with a neural network comprising a pruned deep neural-network based object-detection model for detecting a profile view of the faces of people sitting on a rear side of the vehicle, the neural network including an anchor refine module (ARM) and an object detection module (ODM), wherein the region of interested extracted from the at least one image captured by the at least one camera is provided to the ARM; and
utilizing the neural network including the ODM for inference to determine a number of passengers in the vehicle.

16. The system of claim 15 wherein the instructions are further configured for pruning the neural network by:
identifying filter pairs in the neural network having a high correlation of weights to detect features comprising redundant features.

17. The system of claim 16 wherein the instructions are further configured for pruning the neural network by:
iteratively removing the filter pairs, wherein the neural network is retrained after the iterative removal of the filter pairs.

18. The system of claim 15 wherein the instructions are further configured for pruning the neural network by:
identifying filter pairs in the neural network having a high correlation of weights to detect features comprising redundant features, and
iteratively removing the filter pairs, wherein the neural network is retrained after the iterative removal of the filter pairs.

19. The system of claim 18 wherein the instructions are further configured for pruning the neural network using a regularizer to increase a correlation between features.

20. The system of claim 15 wherein the neural network further comprises a convolutional neural network (CNN) configured for deep learning multiclass object detection.

* * * * *